United States Patent
Nambuya et al.

(10) Patent No.: US 12,002,946 B2
(45) Date of Patent: Jun. 4, 2024

(54) NON-AQUEOUS ELECTROLYTE SECONDARY BATTERY

(71) Applicants: Panasonic Corporation, Kadoma (JP); SANYO Electric Co., Ltd., Daito (JP)

(72) Inventors: Shunsuke Nambuya, Osaka (JP); Yuto Horiuchi, Osaka (JP); Shimpei Yamagami, Osaka (JP)

(73) Assignees: PANASONIC HOLDINGS CORPORATION, Kadoma (JP); PANASONIC ENERGY CO., LTD., Osaka (JP)

( * ) Notice: Subject to any disclaimer, the term of this patent is extended or adjusted under 35 U.S.C. 154(b) by 667 days.

(21) Appl. No.: 17/265,263

(22) PCT Filed: Aug. 2, 2019

(86) PCT No.: PCT/JP2019/030388
§ 371 (c)(1),
(2) Date: Feb. 2, 2021

(87) PCT Pub. No.: WO2020/031869
PCT Pub. Date: Feb. 13, 2020

(65) Prior Publication Data
US 2021/0313564 A1  Oct. 7, 2021

(30) Foreign Application Priority Data
Aug. 7, 2018 (JP) .................. 2018-148266

(51) Int. Cl.
*H01M 4/36* (2006.01)
*H01M 4/134* (2010.01)
(Continued)

(52) U.S. Cl.
CPC ........... *H01M 4/364* (2013.01); *H01M 4/134* (2013.01); *H01M 4/386* (2013.01);
(Continued)

(58) Field of Classification Search
CPC ...... H01M 4/364; H01M 4/134; H01M 4/386; H01M 4/5825
See application file for complete search history.

(56) References Cited

U.S. PATENT DOCUMENTS

2015/0243977 A1* 8/2015 Hirose .................. H01M 4/485
429/213
2017/0125806 A1 5/2017 Wang et al.
(Continued)

FOREIGN PATENT DOCUMENTS

CN 106575751 A 4/2017
CN 106797020 A 5/2017
(Continued)

OTHER PUBLICATIONS

International Search Report dated Oct. 29, 2019, issued in counterpart Application No. PCT/JP2019/030388. (2 pages).
(Continued)

*Primary Examiner* — Olatunji A Godo
(74) *Attorney, Agent, or Firm* — WHDA, LLP (57) ABSTRACT

A nonaqueous electrolyte secondary battery includes a positive electrode, a negative electrode, and an electrolyte liquid. The negative electrode includes a negative electrode mixture layer containing a first negative electrode active material and a negative electrode collector to which the negative electrode mixture layer is adhered. The first negative electrode active material contains a first lithium silicate phase containing lithium, silicon, and oxygen and first silicon particles dispersed in the first lithium silicate phase. An atomic ratio $A_1$:O/Si of the oxygen to the silicon in the first lithium silicate phase satisfies a relationship of $2 < A_1 \leq 3$. At a surface side of the negative electrode, an existence ratio of the first negative electrode active material in the negative electrode mixture layer is high as compared to that at a negative electrode collector side of the negative electrode.

8 Claims, 2 Drawing Sheets

(51) Int. Cl.
  *H01M 4/38*    (2006.01)
  *H01M 4/58*    (2010.01)
  H01M 4/02      (2006.01)
  H01M 10/0566   (2010.01)

(52) U.S. Cl.
  CPC .... *H01M 4/5825* (2013.01); *H01M 2004/027* (2013.01); *H01M 10/0566* (2013.01)

(56) References Cited

U.S. PATENT DOCUMENTS

2017/0214041 A1    7/2017   Minami et al.
2018/0287140 A1   10/2018   Akira et al.

FOREIGN PATENT DOCUMENTS

| JP | 2018-92857 A   | 6/2018 |
| WO | 2016/035289 A1 | 3/2016 |
| WO | 2016/035290 A1 | 3/2016 |
| WO | 2017/051500 A1 | 3/2017 |

OTHER PUBLICATIONS

English Translation of Chinese Search Report dated Aug. 31, 2023, issued in counterpart CN application no. No. 201980033053.4. (3 pages).

* cited by examiner

NON-AQUEOUS ELECTROLYTE SECONDARY BATTERY

TECHNICAL FIELD

The present invention relates to a nonaqueous electrolyte secondary battery which uses a negative electrode active material containing a lithium silicate phase in which silicon particles are dispersed.

BACKGROUND ART

Since having a high voltage and a high energy density, a nonaqueous electrolyte secondary battery, in particular, a lithium ion secondary battery, has been expected to be used as an electric power source of a compact consumer use, an electric power storage device, and/or an electric car. In an environment in which an increase in energy density of a battery has been pursued, as a negative electrode active material having a high theoretical capacity density, the use of a material containing silicone (Si) which forms an alloy with lithium has been anticipated.

Patent Document 1 has proposed a nonaqueous electrolyte secondary battery using a negative electrode active material which contains a lithium silicate phase represented by $Li_{2v}SiO_{2+v}$ (0<v<2) and silicon particles dispersed in the lithium silicate phase. A negative electrode includes a negative electrode collector and a negative electrode mixture layer which is formed on the negative electrode collector and which contains the negative electrode active material described above. Among materials containing silicon, the negative electrode active material described above has a small volume change in association with charge/discharge and also has a small irreversible capacity.

CITATION LIST

Patent Literature

Patent Document 1: International Publication No. 2016/035290

SUMMARY OF INVENTION

Technical Problem

When lithium ions are occluded in a negative electrode active material during charge, the negative electrode active material is expanded, and by a stress generated in association therewith, an electrolyte liquid contained in a negative electrode is pushed out of the negative electrode. During discharge, since lithium ions are released from the negative electrode active material, the negative electrode active material is contracted, and the stress described above is reduced; however, since an affinity between the electrolyte liquid and a negative electrode surface is low, the electrolyte liquid is not likely to permeate the negative electrode. Hence, in association with repetition of charge/discharge, the distribution of the electrolyte liquid in the negative electrode is liable to become non-uniform. That is, at a negative electrode collector side of a negative electrode mixture layer, the electrolyte liquid is liable to be deficient. Because of the non-uniform distribution of the electrolyte liquid in the negative electrode as described above, cycle characteristics of a nonaqueous electrolyte secondary battery is liable to be degraded.

In consideration of those described above, one aspect of the present invention relates to a nonaqueous electrolyte secondary battery which comprises a positive electrode, a negative electrode, and an electrolyte liquid, the negative electrode includes a negative electrode mixture layer containing a first negative electrode active material and a negative electrode collector to which the negative electrode mixture layer is adhered, the first negative electrode active material contains a first lithium silicate phase containing lithium, silicon, and oxygen and first silicon particles dispersed in the first lithium silicate phase, an atomic ratio $A_1$:O/Si of the oxygen to the silicon in the first lithium silicate phase satisfies a relationship of $2<A_1\leq3$, and at a surface side of the negative electrode, an existence ratio of the first negative electrode active material in the negative electrode mixture layer is high as compared to that at a side of the negative electrode collector of the negative electrode.

According to the present invention, the cycle characteristics of the nonaqueous electrolyte secondary battery are improved.

DESCRIPTION OF EMBODIMENTS

A nonaqueous electrolyte secondary battery according to an embodiment of the present invention comprises: a positive electrode; a negative electrode; and an electrolyte liquid. The negative electrode includes a negative electrode mixture layer containing a first negative electrode active material and a negative electrode collector to which the negative electrode mixture layer is adhered. The first negative electrode active material includes a first negative electrode material (hereinafter, referred to as "first negative electrode material LSX" or simply as "first LSX") which contains a first lithium silicate phase (oxide phase) containing lithium (Li), silicon (Si), and oxygen (O) and first silicon particles dispersed in the first lithium silicate phase. An atomic ratio $A_1$:O/Si of O to Si in the first lithium silicate phase satisfies a relationship of $2<A_1\leq3$. At a surface side of the negative electrode, an existence ratio of the first negative electrode active material in the negative electrode mixture layer is high as compared to that at a negative electrode collector side of the negative electrode.

At the surface side of the negative electrode, when the existence ratio of the first negative electrode active material in the negative electrode mixture layer is increased larger than that at the negative electrode collector side of the negative electrode, in association with repetition of charge/discharge, an increase in roughness of the surface of the negative electrode (negative electrode mixture layer) is promoted. Accordingly, the affinity between the electrolyte liquid and the negative electrode surface is improved, and hence, the electrolyte liquid is likely to permeate the negative electrode. As a result, the non-uniform distribution of the electrolyte liquid in the negative electrode caused by the repetition of charge/discharge is suppressed, and the cycle characteristics are improved.

To the increase in roughness of the negative electrode surface in association with the repetition of charge/discharge, a balance in stress generated between an inside portion and a surface portion of the negative electrode mixture layer in association with the expansion of the first negative electrode active material during charge is believed to contribute. In addition, at the surface of the negative electrode mixture layer, since a large amount of a hard first negative electrode active material is present, the periphery of the first negative electrode active material is likely to receive an influence of the stress described above, and this influence is also estimated as one of factors which cause the increase in roughness.

The case in which $2<A_1\leq3$ holds is advantageous in terms of stabilization and lithium ion conductivity. In addition, in particular, from an initial to a middle stage of the cycles, the capacity is likely to be maintained. In addition, since the first lithium silicate phase which satisfies $2<A_1\leq3$ has a high hardness, the expansion and the contraction of the first lithium silicate phase are likely to influence the periphery thereof, and the increase in roughness of the negative electrode surface is advantageously performed.

An atomic ratio: Li/Si of Li to Si in the first lithium silicate phase is, for example, more than 0 to 2 and is, for example, preferably 1 to 2. The first lithium silicate phase may contain, besides Li, Si, and O, small amounts of other elements, such as iron (Fe), chromium (Cr), nickel (Ni), manganese (Mn), copper (Cu), molybdenum (Mo), zinc (Zn), and/or aluminum (Al).

A ½ region of the negative electrode mixture layer from the surface side of the negative electrode is regarded as a first region, and a ½ region of the negative electrode mixture layer from the negative electrode collector side is regarded as a second region. That is, a region of the negative electrode mixture layer having a ½ thickness thereof at the surface side of the negative electrode is regarded as the first region. The region (region having a ½ thickness of the negative electrode mixture layer at the negative electrode collector side thereof) of the negative electrode mixture layer other than the first region is regarded as the second region. In the case described above, a content $M_{1A}$ (percent by mass) of the first negative electrode active material in the first region and a content $M_{1B}$ (percent by mass) of the first negative electrode active material in the second region preferably satisfy a relationship of $0\leq M_{1B}/M_{1A}<1$. When the existence ratio of the first negative electrode active material in the first region is increased larger than that in the second region, the increase in roughness of the negative electrode surface is promoted.

$M_{1B}/M_{1A}$ is more preferably 0 to 0.85 and further preferably 0.3 to 0.6.

In addition, when $M_{1B}$ is 0, in the second region, an active material other than the first negative electrode active material may be contained. As the active material other than the first negative electrode active material, for example, at least one of a second negative electrode active material and a third negative electrode active material each of which will be described later may be used.

The second region of the negative electrode mixture layer may contain at least the second negative electrode active material. The second negative electrode active material includes a second negative electrode material (hereinafter, referred to as "second negative electrode material LSX" or simply as "second LSX") which contains a second lithium silicate phase (oxide phase) containing lithium (Li), silicon (Si), and oxygen (O) and second silicon particles dispersed in the second lithium silicate phase.

An atomic ratio $A_2$:O/Si of O to Si in the second lithium silicate phase of the second negative electrode active material satisfies a relationship of $3<A_2\leq4$. In the case in which $3<A_2\leq4$ holds, after the middle stage of the cycles, the capacity is likely to be maintained. An atomic ratio: Li/Si of Li to Si of the second lithium silicate phase is, for example, more than 2 and less than 4. The second lithium silicate phase may also contain, besides Li, Si, and O, small amounts of other elements. As the other elements, the elements describe by way of example for the first lithium silicate phase may be mentioned.

When the second negative electrode active material is further used, from the initial stage to the middle stage and later of the cycles, a high capacity is maintained. An increase in capacity and an improvement in cycle characteristics are likely to be simultaneously achieved.

As the O/Si ratio of the lithium silicate phase is decreased, the hardness of LSX is increased. Since $A_1<A_2$ holds, the hardness of the first negative electrode active material is higher than that of the second negative electrode active material. Since the second negative electrode active material having a low hardness as compared to that of the first negative electrode active material is further used, the capacity can be not only further improved, but the balance in stress between the first region and the second region is also likely to be adjusted, so that the increase in roughness of the negative electrode surface is likely to be promoted. In addition, since the second negative electrode active material having a low hardness as compared to that of the first negative electrode active material is used, the influence of the expansion and the contraction of the hard first negative electrode active material on the periphery thereof can be reduced, and storage of the stress caused by the first negative electrode active material is reduced. Accordingly, a preferable electrically conductive network between active material particles of the negative electrode mixture layer is maintained. A preferable contact state between the negative electrode mixture layer and the negative electrode collector is also maintained.

$A_1/A_2$ is preferably 0.75 or less and more preferably 0.62 to 0.75.

The first region may contain the first negative electrode active material, and the second region may contain the second negative electrode active material.

The first region and the second region each may contain the first negative electrode active material and the second negative electrode active material. In the case described above, a mass ratio $M_A$ of the first negative electrode active material to the total of the first negative electrode active material and the second negative electrode active material in the first region and a mass ratio $M_B$ of the first negative electrode active material to the total of the first negative electrode active material and the second negative electrode active material in the second region preferably satisfy a relationship of $M_B/M_A<1$. In the case described above, the increase in roughness of the negative electrode surface in association with the repetition of charge/discharge is likely to be promoted. From the initial stage to the middle stage and later of the cycles, a high capacity is maintained.

$M_B/M_A$ is more preferably 0.95 or less and further preferably 0.70 to 0.85.

The first lithium silicate phase of the first LSX has a composition represented, for example, by a formula: $Li_2Si_xO_{2x+1}$, and x preferably satisfies a relationship of $1\leq x\leq2$. The case in which $1\leq x\leq2$ holds is advantageous in terms of stabilization and lithium ion conductivity. In addition, in particular, from the initial stage to the middle stage of the cycles, the capacity is likely to be maintained.

The second lithium silicate phase of the second LSX has a composition represented, for example, by a formula: $Li_2Si_yO_{2y+1}$, and y preferably satisfies a relationship of $½≤y<1$. In the case in which $½≤y<1$ holds, after the middle stage of the cycles, the capacity is likely to be maintained.

In order to promote the increase in roughness of the negative electrode surface, x=2 and y=½ are preferably satisfied.

In view of the improvement in cycle characteristics and the increase in capacity, the mass ratio $M_A$ is preferably 0.65 to 0.71, and the mass ratio $M_B$ is preferably 0.50 to 0.61. The mass ratio $M_A$ is more preferably 0.68 to 0.71, and the mass ratio $M_B$ is more preferably 0.50 to 0.56.

The mass ratios $M_A$ and $M_B$ described above can be obtained, for example, by the following procedure. In this embodiment, as the negative electrode active material, the case in which a carbon material (carbon particles) which electrochemically occludes and releases lithium ions is used together with the LSX particles will be described.

The battery in an initial discharge state is disassembled, and the negative electrode is taken out. In addition, in the discharge state, the Si particles dispersed in the lithium silicate phase are placed in a state in which lithium ions are not occluded. The first region of the negative electrode mixture layer is scraped out, so that a sample of the powdered negative electrode mixture is obtained. By using an X-ray photoelectron spectroscopic method (XPS) or the like, a total content $M_{Ta}$ of the LSX particles in the sample (first region) is obtained.

In addition, the negative electrode is buried in an epoxy resin and polished to obtain a cross-section of the negative electrode mixture layer (LSX particles). The cross-section of the first region is photographed using a scanning electron microscope (SEM) to obtain a first image (200 µm×200 µm). In order to discriminate the LSX particles from the carbon particles, the first image is processed by a binarization treatment. Among LSX particles having cross-sections confirmable by the first image, 10 LSX particles in the descending order from a particle having a largest maximum particle diameter are selected. On the cross-section of each of the 10 LSX particles thus selected, an element analysis using an electron beam probe microanalyzer (EPMA) is performed to obtain the composition of the LSX particle and the composition ($Li_2Si_tO_{2t+1}$) of the lithium silicate phase in the LSX particle. When t is 1 or more, the particle is regarded as the first LSX particle. When t is less than 1, the particle is regarded as the second LSX particle. A total area $A_{1a}$ of the first LSX particles selected as described above and an average value (x) of t are obtained. A total area $A_{2a}$ of the second LSX particles selected as described above and an average value (y) of t are obtained.

Based on the results obtained as described above, the content $M_{1a}$ of the first LSX particles and a content $M_{2a}$ of the second LSX particles in the first region are obtained. $M_{1A}/(M_{1A}+M_{2A})$ is regarded as the mass ratio $M_A$.

By the same method as that in the case of the content $M_{1A}$ of the first LSX particles and the content $M_{2A}$ of the second LSX particles in the first region, the content $M_{1B}$ of the first LSX particles and a content $M_{2B}$ of the second LSX particles in the second region are obtained. $M_{1B}/(M_{1B}+M_{2B})$ is regarded as the mass ratio $M_B$.

In addition, although the surfaces of the LSX particles are covered with electrically conductive layers in some cases, since the electrically conductive layer is very thin, and the amount thereof is very low, the mass of the electrically conductive layer is ignored.

Before a first charge (in the formation of the negative electrode), the second region of the negative electrode mixture layer may contain at least a precursor of the second negative electrode active material. The composition of the precursor of the second negative electrode active material is represented by a formula: $SiO_z$, and z may satisfy a relationship of $0.55≤z≤1.5$. In the case described above, the first lithium silicate phase of the first negative electrode active material is preferably $Li_2Si_2O_5$. Since the difference in hardness between the first negative electrode active material (having a Vickers hardness of 177) in which the first lithium silicate phase is represented by $Li_2Si_2O_5$ and $SiO_z$ (having a Vickers hardness of 41) is large, when those two materials are used in combination, at the initial stage of the charge/discharge cycles, the increase in roughness of the negative electrode surface is likely to be promoted.

When $SiO_z$ is used in combination with the first LSX, the capacity after the middle stage of the cycles is advantageously maintained. In addition, $SiO_z$ contains a $SiO_2$ phase and Si particles dispersed in the $SiO_2$ phase. By the first charge, the $SiO_2$ phase occludes lithium ions to generate the second LSX containing a $Li_4SiO_4$ phase as a primary component. The Si particles dispersed in the $Li_4SiO_4$ phase also occlude lithium ions. The mass of the second LSX generated from 1 g of SiOz after the first charge is approximately 1.6 g. Before the first charge (in the formation of the negative electrode), the use of 1 g of SiOz corresponds to the use of approximately 1.16 g of the second LSX (in the state in which lithium ions are not occluded in the Si particles dispersed in the $Li_4SiO_4$ phase). On the other hand, during discharge, lithium ions are hardly released from the $Li_4SiO_4$ phase, and the $Li_4SiO_4$ phase is maintained. Hence, after the middle stage of the cycles, the degradation of the negative electrode is not likely to occur.

Before the first charge (in the formation of the negative electrode), the first region and the second region each may contain the first negative electrode active material and $SiO_z$. In the case described above, a mass ratio $M_a$ of the first negative electrode active material to the total of the first negative electrode active material and SiOz in the first region and a mass ratio $M_b$ of the first negative electrode active material to the total of the first negative electrode active material and SiOz in the second region preferably satisfy a relationship of $M_b/M_a<1$. The mass ratio $M_a$ is more preferably 0.67 to less than 0.75, and the mass ratio $M_b$ is more preferably more than 0.5 and less than 0.67. The mass ratio $M_a$ is further preferably 0.68 to 0.74, and the mass ratio $M_b$ is further preferably 0.54 to 0.65. In the case described above, the mass ratios $M_A$ and $M_B$ are likely to be adjusted in the above preferable ranges.

Negative Electrode Material LSX

Hereinafter, common matters of the first LSX and the second LSX (hereinafter, referred to as "negative electrode material LSX" or also simply as "LSX") will be described.

The negative electrode material LSX contains a lithium silicate phase (oxide phase) containing lithium (Li), silicon (Si), and oxygen (O) and silicon particles dispersed in the lithium silicate phase. As the content of the silicon particles in the negative electrode material LSX is increased, the negative electrode capacity is increased. The lithium silicate phase may have a composition represented by $Li_2Si_uO_{2u+1}$. In the case of the first negative electrode material LSX, $1≤u$ holds, and $1≤u≤2$ preferably holds. In the case of the second negative electrode material LSX, $½≤u<1$ holds.

Compared to a $SiO_2$ matrix in $SiO_z$ (0.5≤z≤1.5), in the lithium silicate phase, the number of sites reactable with lithium is small. Hence, an irreversible capacity in association with charge/discharge is not likely to be generated in LSX as compared to that in $SiO_z$. When the silicon particles are dispersed in the lithium silicate phase, at the initial charge/discharge, an excellent charge/discharge efficiency can be obtained. In addition, since the content of the silicon particles can be arbitrarily changed, a high capacity negative electrode can be designed.

The crystallite size of the silicon particles dispersed in the lithium silicate phase is, for example, 10 nm or more. The silicon particle has a particulate phase of single silicon (Si). When the crystallite size of the silicon particle is set to 10 nm or more, since a surface area of the silicon particle can be decreased small, the silicon particles are not likely to be degraded to generate the irreversible capacity. The crystallite size of the silicon particle can be calculated from a half bandwidth of a diffraction peak which belongs to the Si (111) plane of an X-ray diffraction (XRD) pattern of the silicon particles by Scherrer's equation.

The negative electrode material LSX is also excellent in structural stability. The reason for this is that since the silicon particles are dispersed in the lithium silicate phase, expansion and contraction of the negative electrode material LSX in association with charge/discharge can be suppressed. In order to suppress the silicon particle itself being cracked, before the first charge, the average particle diameter of the silicon particles is preferably 500 nm or less, more preferably 200 nm or less, and further preferably 50 nm or less. After the first charge, the average particle diameter of the silicon particles is preferably 400 nm or less and more preferably 100 nm or less. Since the silicon particles are miniaturized, the volume change in charge/discharge is decreased, and the structural stability of the negative electrode material LSX is further improved.

The average particle diameter of the silicon particles is measured by observation of a cross-sectional SEM (scanning electron microscope) photo of the negative electrode material LSX. In particular, the average particle diameter of the silicon particles is obtained by averaging the maximum diameters of randomly selected 100 silicon particles. The silicon particle is formed by aggregation of a plurality of crystallites.

In view of the increase in capacity, the content of the silicon particles in the negative electrode material LSX may be, for example, 30 percent by mass or more, preferably 50 percent by mass or more, and more preferably 55 percent by mass or more. In the case described above, the diffusivity of lithium ions is excellent, and superior load characteristics are likely to be obtained. On the other hand, in view of the improvement in cycle characteristics, the content of the silicon particles in the negative electrode material LSX is preferably 95 percent by mass or less, more preferably 80 percent by mass or less, and further preferably 75 percent by mass or less. The reason for this is that since the surfaces of the silicon particles to be exposed without being covered with the lithium silicate phase are decreased, a reaction between the electrolyte liquid and the silicon particles is likely to be suppressed.

The content of the silicon particles can be measured by Si-NMR. Hereinafter, desired measurement conditions of Si-NMR are shown.

Measurement apparatus: manufactured by Varian, Solid-state nuclear magnetic resonance spectroscopy apparatus (INOVA-400)
Probe: Varian 7 mm CPMAS-2
MAS: 4.2 KHz
MAS Rate: 4 KHz
Pulse: DD (45° pulse+signal acquisition time 1 H decoupling)
Repetition time: 1,200 seconds
Observation width: 100 KHz
Center of observation: approximately −100 ppm
Signal acquisition time: 0.05 seconds
Number of scans: 560
Sample amount: 207.6 mg The composition of $Li_zSi_uO_{2u+1}$ of the lithium silicate phase can be analyzed, for example, by the following method.

First, the mass of the sample of the negative electrode material LSX is measured. Subsequently, as described below, the contents of carbon, lithium, and oxygen contained in the sample are calculated. Next, the carbon content is subtracted from the mass of the sample, the contents of lithium and oxygen occupied in the remaining amount are calculated, and from a molar ratio of lithium (Li) and oxygen (O), a ratio between 2 and (2u+1) is obtained.

The carbon content is measured using a carbon/sulfur analysis apparatus (such as EMIA-520 model, manufactured by HORIBA, Ltd.). The sample is fitted to a magnetic board and then inserted in a combustion furnace (carrier gas: oxygen) heated to 1,350° C. with a combustion improver, and a carbon dioxide amount generated in combustion is detected by an infrared absorption. A calibration curve is formed, for example, using carbon steel (carbon content: 0.49%) manufactured by Bureau of Analysed Sampe. Ltd., and the carbon content of the sample is calculated (high-frequency induction heating furnace combustion-infrared absorption method).

The oxygen content is measured using an oxygen/nitrogen/hydrogen analysis apparatus (such as EGMA-830 model, manufactured by HORIBA, Ltd.). The sample is received in a Ni capsule and then charged in a carbon crucible heated by an electric power of 5.75 kw together with Sn pellets and Ni pellets to be used as flux, and a carbon monoxide gas to be released is detected. A calibration curve is formed using a standard sample of $Y_2O_3$, and the oxygen content of the sample is calculated (inert gas fusion-nondispersive infrared absorption method).

The lithium content is measured such that after the sample is fully melted in a hot fluonitric acid (mixed acid of heated hydrofluoric acid and nitric acid), and carbon as a molten residue is removed by filtration, a filtrate thus obtained is analyzed using an inductively-coupled plasma atomic emission spectroscopic method (ICP-AES). A calibration curve is formed using a commercially available standard solution of lithium, and the lithium content of the sample is calculated.

The amount obtained by subtracting the carbon content, the oxygen content, and the lithium content from the mass of the sample of the negative electrode material LSX is the silicon content. In this silicon content, the silicon present in the form of the silicon particles and the silicon present in the form of the lithium silicate are contained. By a Si-NMR measurement, the content of the silicon particles is obtained, and the content of the silicon present in the form of the lithium silicate in the negative electrode material LSX is obtained.

The negative electrode material LSX preferably forms a particulate material (hereinafter, also referred to as "LSX particles") having an average particle diameter of 1 to 25 µm or further having an average particle diameter of 4 to 15 µm. In the particle diameter range described above, the stress generated by the volume change of the negative electrode material LSX in association with charge/discharge is likely to be reduced, and preferable cycle characteristics are likely to be obtained. The surface areas of the LSX particles become appropriate, and a decrease in capacity caused by a sub-reaction with a nonaqueous electrolyte is also suppressed.

The average particle diameter of the LSX particles indicates a particle diameter (volume average particle diameter) at a volume integrated value of 50% in a particle size distribution measured by a laser diffraction scattering method. For the measurement apparatus, for example, "LA-750" manufactured by HORIBA, Ltd. may be used.

The LSX particle is preferably provided with an electrically conductive material which covers at least a part of the surface thereof. Since the lithium silicate phase has a poor electron conductivity, the electric conductivity of the LSX particle also tends to be low. Since the surface thereof is covered with an electrically conductive material, the electric conductivity is significantly increased. An electrically conductive layer (layer including the electrically conductive material) which covers at least a part of the surface of the LSX particle is preferably thin so as not to influence the average particle diameter of the LSX particle. The first negative electrode active material may be the first LSX particles having the surfaces provided with the electrically conductive layers. The second negative electrode active material may be the second LSX particles having the surfaces provided with the electrically conductive layers.

Next, a nonaqueous electrolyte secondary battery according to an embodiment of the present invention will be described in detail. The nonaqueous electrolyte secondary battery includes, for example, a negative electrode, a positive electrode, and a nonaqueous electrolyte as described below.

Negative Electrode

The negative electrode includes a negative electrode collector and a negative electrode mixture layer which is formed on at least one surface of the negative electrode collector and which contains a negative electrode active material. The negative electrode mixture layer can be formed such that a negative electrode slurry in which a negative electrode mixture is dispersed in a dispersion medium is applied on the surface of the negative electrode collector and is then dried. For example, after a second negative electrode slurry which forms the second region is applied on the negative electrode collector, and a first negative electrode slurry which forms the first region is applied on the coating film of the second slurry, the coating films of the first negative electrode slurry and the second negative electrode slurry may be dried. The coating films thus dried may be rolled, if needed. The negative electrode mixture layer may be formed on one surface of the negative electrode collector or may also be formed on each of two surfaces thereof.

As the negative electrode active material which electrochemically occludes and releases lithium ions, the negative electrode mixture contains, as an essential component, the negative electrode material LSX (or the LSX particles) and may contain, as an arbitrary component, a binding agent, an electrically conductive agent, a thickening agent, and/or the like. Since being able to occlude many lithium ions, the silicon particles in the negative electrode material LSX contributes to the increase in capacity of the negative electrode. The negative electrode material LSX contains at least the first negative electrode material LSX and in addition, may also contain the second negative electrode material LSX. When the second negative electrode material LSX is used, in the formation of the negative electrode (before the first charge), instead of the second negative electrode material LSX, $SiO_z$ which is a precursor of the second negative electrode material LSX may be contained in the negative electrode mixture.

In the negative electrode mixture, a third negative electrode active material which electrically occludes and releases lithium ions is preferably further contained. As the third negative electrode active material, for example, there may be mentioned an active material containing as a primary component, a carbon material, lithium titanate, or tin oxide, or an active material containing as a primary component, silicon, a silicon oxide ($SiO_2$), or a silicon alloy.

The third negative electrode active material is preferably a carbon material. Since the volume of the negative electrode material LSX is expanded and contracted in association with charge/discharge, when the rate thereof occupied in the negative electrode active material is increased, a contact failure is liable to occur between the negative electrode active material and the negative electrode collector in association with charge/discharge. On the other hand, when the negative electrode material LSX is used in combination with the carbon material, while a high capacity of the silicon particles is imparted to the negative electrode, excellent cycle characteristics can be achieved. The rate of the negative electrode material LSX occupied in the total of the negative electrode material LSX and the carbon material is preferably, for example, 3 to 30 percent by mass. Accordingly, the increase in capacity and the improvement in cycle characteristics are likely to be simultaneously achieved.

As the carbon material, for example, there may be mentioned a graphite, a graphitizable carbon (soft carbon), or a non-graphitizable carbon (hard carbon). Among those mentioned above, a graphite which is excellent in charge/discharge stability and which has a low irreversible capacity is preferable. The graphite indicates a material having a graphite type crystalline structure and may include a natural graphite, an artificial graphite, graphitized mesophase carbon particles, and the like. The carbon material may be used alone, or at least two types thereof may be used in combination.

As the binding agent, for example, there may be mentioned resin materials including a fluorine resin, such as a polytetrafluoroethylene or a poly (vinylidene fluoride) (PVDF); a polyolefin resin, such as a polyethylene or a polypropylene; a polyamide resin, such as an aramid resin; a polyimide resin, such as a polyimide or a poly amide imide); an acrylic resin, such as poly(acrylic acid), a poly (methyl acrylate), or an ethylene-acrylic acid copolymer; a vinyl resin such as a poly(vinyl acetate); a poly(vinyl pyrrolidone); and a poly(ether sulfone); and a rubber materials including a styrene-butadiene copolymer (SBR). Those mentioned above may be uses alone, or at least two types thereof may be used in combination.

As the electrically conductive agent, for example, there may be mentioned a carbon such as an acetylene black or carbon nanotubes; electrically conductive fibers, such as carbon fibers or metal fibers; a carbon fluoride; a metal powder of aluminum or the like; electrically conductive whiskers of zinc oxide or potassium titanate; an electrically conductive metal oxide such as titanium oxide; or an organic electrically conductive material such as a phenylene derivative. Those mentioned above may be used alone, or at least two types thereof may be used in combination.

As the thickening agent, for example, there may be mentioned a cellulose derivative (including a cellulose ether), such as a carboxymethyl cellulose (CMC), a modified material thereof (including a salt, such as a Na salt), or a methylcellulose; a saponified product of a polymer, such as a poly(vinyl alcohol), having a vinyl acetate unit; or a polyether (such as a poly(alkylene oxide) including a poly (ethylene oxide)). Those mentioned above may be used alone, or at least two types thereof may be used in combination.

Although the dispersion medium is not particularly limited, for example, there may be mentioned water; an alcohol such as ethanol; an ether such as tetrahydrofuran; an amide such as dimethylformamide; N-methyl-2-pyrrolidone (NMP), or a mixed solvent thereof.

As the negative electrode collector, for example, a poreless electrically conductive substrate (such as metal foil) or a porous electrically conductive substrate (such as a mesh, a net, or a punching sheet) may be used. As a material of the negative electrode collector, for example, there may be mentioned stainless steel, nickel, a nickel alloy, copper, or a copper alloy. Although not particularly limited, in consideration of the balance between the strength of the negative electrode and the reduction in weight thereof, the thickness of the negative electrode collector is preferably 1 to 50 μm and more preferably 5 to 20 μm.

Positive Electrode

The positive electrode includes, for example, a positive electrode collector and a positive electrode mixture layer formed on at least one surface of the positive electrode collector. The positive electrode mixture layer is formed such that a positive electrode slurry in which a positive electrode mixture is dispersed in a dispersion medium is applied on the surface of the positive electrode collector and then dried. The coating film thus dried may be rolled, if needed. The positive electrode mixture layer may be formed on one surface of the positive electrode collector or may also be formed on each of two surfaces thereof.

As the positive electrode active material, a lithium composite metal oxide may be used. For example, $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, or $Li_2MPO_4F$ (M is at least one selected from the group consisting of Na, Mg, Sc, Y, Mn, Fe, Co, Ni, Cu, Zn, Al, Cr, Pb, Sb, and B) may be mentioned. In the case described above, a=0~1.2, b=0~0.9, and c=2.0~2.3 hold. In addition, the a value which indicates a molar ratio of lithium is a value immediately after the formation of the active material and is increased and decreased by charge/discharge.

Among those mentioned above, a lithium nickel composite oxide represented by $Li_aNi_bM_{1-b}O_2$ (M is at least one selected from the group consisting of Mn, Co, and Al, and 0<a≤1.2 and 0.3≤b≤1 hold) is preferable. In view of the increase in capacity, 0.85≤b≤1 is more preferably satisfied. In view of the stability of the crystalline structure, $Li_aNi_b$-$Co_cAl_dO_2$ (0<a≤1.2, 0.85≤b≤1, 0<c<0.15, 0<d≤0.1, and b+c+d=1 hold) containing Co and Al as M is further preferable.

As the binding agent and the electrically conductive agent, agents similar to those described by way of example for the negative electrode may be used. As the electrically conductive agent, a graphite, such as a natural graphite or an artificial graphite, may also be used.

The shape and the thickness of the positive electrode collector may be selected from the shape and the thickness range, respectively, in accordance with the negative electrode collector. As a material of the positive electrode collector, for example, stainless steel, aluminum, an aluminum alloy, or titanium may be mentioned.

Electrolyte Liquid

The electrolyte liquid contains a nonaqueous solvent and a lithium salt dissolved in the nonaqueous solvent. The concentration of the lithium salt in the electrolyte liquid is preferably, for example, 0.5 to 2 mol/L. When the concentration of the lithium salt is controlled in the range described above, an electrolyte liquid having an excellent ion conductivity and an appropriate viscous property can be obtained. However, the concentration of the lithium salt is not limited to that described above.

As the nonaqueous solvent, for example, a cyclic carbonate ester, a chain carbonate ester, a cyclic carboxylate ester, or a chain carboxylate ester may be used. As the cyclic carbonate ester, for example, propylene carbonate (PC) or ethylene carbonate (EC) may be mentioned. As the chain carbonate ester, for example, diethyl carbonate (DEC), ethyl methyl carbonate (EMC), or dimethyl carbonate (DMC) may be mentioned. As the cyclic carboxylate ester, for example, γ-butyrolactone (GBL) or γ-valerolactone (GVL) may be mentioned. As the chain carboxylate ester, for example, methyl formate, ethyl formate, propyl formate, methyl acetate, ethyl acetate, propyl acetate, methyl propionate, ethyl propionate, or propyl propionate may be mentioned. The nonaqueous solvent may be used alone, or at least two types thereof may be used in combination.

As the lithium salt, a known lithium salt may be used. As a preferable lithium salt, for example, there may be mentioned $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, a lithium lower aliphatic carboxylate, LiCl, LiBr, LiI, a borate salt, or an imide salt. As the borate salt, for example, bis(1,2-benzenediolate(2-)-O,O')lithium borate, bis(2,3-naphthalenediolate (2-)-O,O')lithium borate, bis(2,2'-biphenyldiolate(2-)-O,O') lithium borate, or bis(5-fluoro-2-olate-1-benzene sulfonic acid-O,O')lithium borate may be mentioned. As the imide salt, for example, bis(fluorosulfonyl)imide lithium (LiN $(SO_2F)_2$), bistrifluoromethanesulfonimide lithium (LiN $(CF_3SO_2)_2$), (trifluoromethanesulfonyl) (nonafluorobutanesulfonyl)imide lithium ($LiN(CF_3SO_2)$ $(C_4F_9SO_2)_2$), or bispentafluoroethanesulfonimide lithium ($LiN(C_2F_5SO_2)_2$) may be mentioned. Among those mentioned above, $LiPF_6$ is preferable. The lithium salt may be used alone, or at least two types thereof may be used in combination.

Separator

In general, the separator is preferably provided between the positive electrode and the negative electrode. The separator has a high ion permeability, an appropriate mechanical strength, and an appropriate insulating property. As the separator, for example, a fine porous thin film, a woven cloth, or a non-woven cloth may be used. As a material of the separator, for example, a polyolefin, such as a polypropylene or a polyethylene, is preferably used.

As one example of the structure of the nonaqueous electrolyte secondary battery, a structure in which a nonaqueous electrolyte and an electrode group formed by winding a positive electrode, a negative electrode, and at least one separator are received in an exterior package may be mentioned. Alternatively, instead of the winding type electrode group, an electrode group having another structure, such as a laminate type electrode group in which positive electrodes and negative electrodes are laminated with separators interposed therebetween, may also be used. The nonaqueous electrolyte secondary battery may have any shape, such as a cylindrical type, a square type, a coin type, a button type, or a laminate type.

Figure 1:
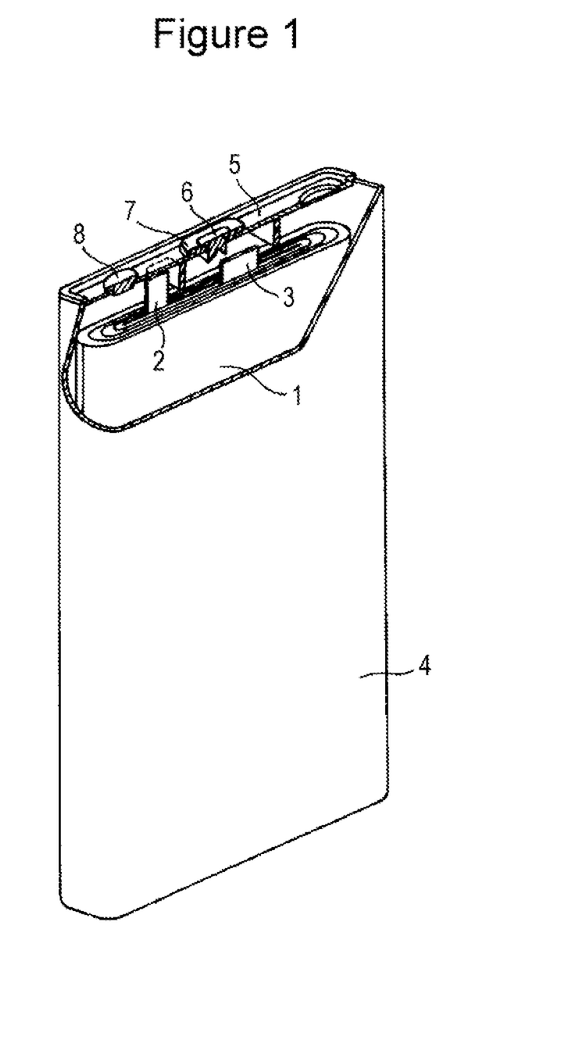
FIG. 1 is a partially notched schematic perspective view of a nonaqueous electrolyte secondary battery according to an embodiment of the present invention.

FIG. 1 is a partially notched schematic perspective view of a square nonaqueous electrolyte secondary battery according to one embodiment of the present invention.

The battery includes a bottom-closed square battery case 4, an electrode group 1 received in the battery case 4, and an electrolyte liquid (not shown) received therein. The electrode group 1 includes a long belt-shaped negative electrode, a long belt-shaped positive electrode, and separators provided therebetween so as to prevent direct contact between the electrodes. The electrode group 1 is formed such that after the negative electrode, the positive electrode, and the separators are wound around a flat winding core, the winding core is removed.

To a negative electrode collector of the negative electrode, one end of a negative electrode lead 3 is fitted by welding or the like. The other end of the negative electrode lead 3 is electrically connected to a negative electrode terminal 6 provided for a sealing plate 5 through a resin-made insulating plate (not shown). The negative electrode terminal 6 is insulated from the sealing plate 5 by a resin-made gasket 7. To a positive electrode collector of the positive electrode, one end of a positive electrode lead 2 is fitted by welding or the like. The other end of the positive electrode lead 2 is electrically connected to a rear surface of the sealing plate 5 through the insulating plate. That is, the positive electrode lead 2 is electrically connected to the battery case 4 which also functions as a positive electrode terminal. The insulating plate insulates not only between the electrode group 1 and the sealing plate 5 but also between the negative electrode lead 3 and the battery case 4. The periphery of the sealing plate 5 is fitted to an opening end portion of the battery case 4, and this fitting portion is laser-welded. As described above, an opening portion of the battery case 4 is sealed with the sealing plate 5. A nonaqueous electrolyte charge port provided in the sealing plate 5 is sealed with a sealing plug 8.

Figure 2:
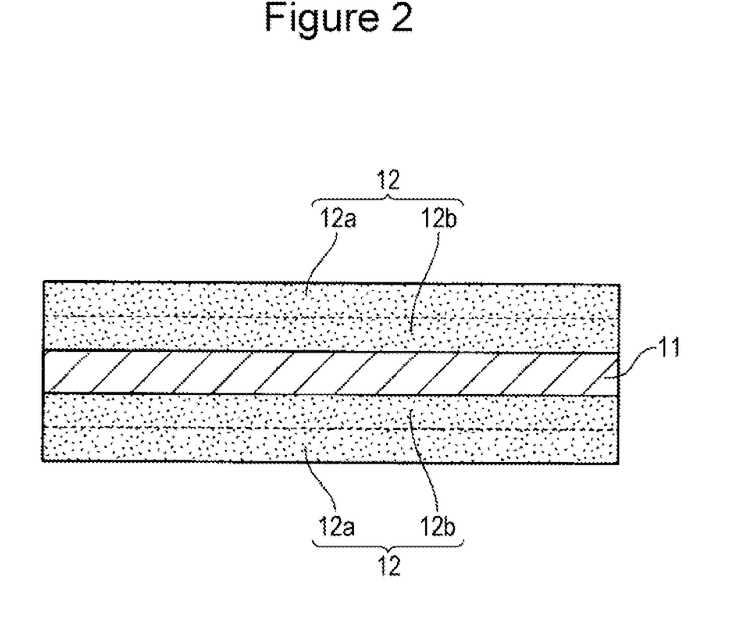
FIG. 2 is a schematic cross-sectional view of a negative electrode used in the nonaqueous electrolyte secondary battery shown in FIG. 1.

FIG. 2 is a schematic cross-sectional view of the negative electrode used in the nonaqueous electrolyte secondary battery shown in FIG. 1.

The negative electrode includes a negative electrode collector 11 and negative electrode mixture layers 12 formed on two surfaces of the negative electrode collector 11. The negative electrode mixture layers 12 each have a first region 12a at a surface side of the negative electrode and a second region 12b at a negative electrode collector 11 side, the regions each having a thickness one-half that of the negative electrode mixture layer 12. The first region 12a of the negative electrode mixture layer 12 contains at least the first negative electrode active material. The ratio: $M_{1B}/M_{1A}$ of the content $M_{1B}$ of the first negative electrode active material in the second region to the content $M_{1A}$ of the first negative electrode active material in the first region is 0 to less than 1.

Hereinafter, although the present invention will be described in detail with reference to examples and comparative examples, the present invention is not limited to the following examples.

EXAMPLE 1

Formation of First Negative Electrode Active Material

Silicon dioxide and lithium carbonate were mixed together to have an atomic ratio: Si/Li of 1.05, and the mixture thus obtained was fired at 950° C. for 10 hours in air, so that a lithium silicate represented by a formula: $Li_2Si_2O_5$ (x=2) was obtained. The lithium silicate thus obtained was pulverized to have an average particle diameter of 10 μm.

The lithium silicate ($Li_2Si_2O_5$) having an average particle diameter of 10 μm and a silicon raw material (3N, average particle diameter: 10 μm) were mixed together to have a mass ratio of 45:55. After the mixture thus obtained was charged in a pot (formed from SUS, volume: 500 mL) of a planetary ball mill (manufactured by Fritsch, P-5), and 24 SUS-made balls (diameter: 20 mm) were also charged in the pot, the pot was lidded, and a pulverization treatment was performed on the mixture at 200 rpm for 50 hours in an inert atmosphere.

Subsequently, after the powdered mixture was recovered in an inert atmosphere, firing was performed at 800° C. for 4 hours in an inert atmosphere while the pressure was applied by a hot press machine, so that a sintered body (first negative electrode material LSX) of the mixture was obtained.

Subsequently, after the first negative electrode material LSX was pulverized and was allowed to pass through a 40-μm mesh, the first LSX particles thus obtained were mixed with a coal pitch (manufactured by JFE Chemicals Corporation, MCP250), and the mixture thus obtained was fired at 800° C. in an inert atmosphere to cover the surfaces of the first LSX particles with an electrically conductive carbon, so that electrically conductive layers were formed. The covering amount of the electrically conductive layer was set to 5 percent by mass with respect to the total mass of the first LSX particle and the electrically conductive layer. Next, by using a sieve, first LSX particles (a first negative electrode active material) which had an average particle diameter of 5 μm and which had surfaces on which the electrically conductive layers were provided were obtained.

The crystallite size of the silicon particle calculated from a diffraction peak which belonged to the Si (111) plane obtained by an XRD analysis of the first LSX particle by Scherrer's equation was 15 nm.

When the composition of the lithium silicate phase was analyzed by the methods described above (a high-frequency induction heating furnace combustion-infrared absorption method, an inert gas fusion-nondispersive infrared absorption method, and an inductively-coupled plasma atomic emission spectroscopic method (ICP-AES)), the O/Si ratio was 2.5, and the Si/Li ratio was 1.0. The content of the $Li_2Si_2O_5$ in the first LSX particle measured by Si-NMR was 45 percent by mass (the content of the silicon particles was 55 percent by mass).

Formation of Precursor of Second Negative Electrode Active Material $SiO_z$ particles (z=1, average particle diameter: 5 μm) in which Si particles were dispersed in a $SiO_2$ phase were mixed with a coal pitch (manufactured by JFE Chemicals Corporation, MCP250), and the mixture thus obtained was fired at 800° C. in an inert atmosphere to cover the surfaces of the $SiO_z$ particles with an electrically conductive carbon, so that electrically conductive layers were formed. The covering amount of the electrically conductive layer was set to 5 percent by mass with respect to the total mass of the $SiO_z$ particle and the electrically conductive layer. As described above, the $SiO_z$ particles (precursor of a second negative electrode active material) each having the surface on which the electrically conductive layer was provided were obtained.

In addition, by the first charge, the $SiO_2$ phase of the $SiO_z$ particles was primarily changed to a $Li_4SiO_4$ phase. That is, the second LSX particles each of which contained the $Li_4SiO_4$ phase and Si particles (in a state in which lithium ions were occluded) dispersed in the $Li_4SiO_4$ phase were obtained. The content of $Li_4SiO_4$ in the second LSX particle thus obtained was 42 percent by mass. The remaining 58 percent by mass was the content of the Si particles which occluded lithium ions by the first charge, and the content of Si particles other than the lithium ions occluded in the Si particles was 29 percent by mass.

Formation of Negative Electrode

First, 7.5 parts by mass of the first negative electrode active material, 3.0 parts by mass of the precursor of the second negative electrode active material, and 89.5 parts by mass of a third negative electrode active material were mixed together, so that a first mixture was obtained. As the third negative electrode active material, a graphite was used. Subsequently, 97.5 parts by mass of the first mixture, 1 part by mass of a sodium carboxymethyl cellulose (CMC-Na), 1.5 parts by mass of a styrene-butadiene rubber (SBR), and an appropriate amount of water were mixed together, so that a first slurry was prepared.

Next, 4.5 parts by mass of the first negative electrode active material, 3.0 parts by mass of the precursor of the second negative electrode active material, and 92.5 parts by mass of the third negative electrode active material were mixed together, so that a second mixture was obtained. As the third negative electrode active material, a graphite was used. Subsequently, 97.5 parts by mass of the second mixture, 1 part by mass of a CMC-Na, 1.5 parts by mass of an SBR, and an appropriate amount of water were mixed together, so that a second slurry was prepared.

In addition, when the first mixture and the second mixture were prepared, the addition of 3.0 parts by mass of the precursor of the second negative electrode active material corresponded to the addition of 3.5 parts by mass of the second negative electrode active material (second LSX particles each containing the $Li_4SiO_4$ phase and Si particles (in a state in which lithium ions were not occluded) dispersed in the $Li_4SiO_4$ phase)).

The second slurry was applied on two surfaces of copper foil, the first slurry was applied on the coating films of the second slurry, and the coating films of the first slurry and the second slurry were dried, followed by rolling, so that a negative electrode in which negative electrode mixture layers each having a density of 1.5 $g/cm^3$ were formed on the two surfaces of the copper foil was formed.

The negative electrode mixture layer had a second layer (second region) formed on the copper foil by the second slurry and a first layer (first region) formed on the second layer by the first slurry, and the thicknesses of the first layer and the second layer were each set to 94 μm.

Formation of Positive Electrode

First, 95 parts by mass of a lithium nickel composite oxide ($LiNi_{0.8}CO_{0.18}Al_{0.02}O_2$), 2.5 parts by mass of an acetylene black, 2.5 parts by mass of a poly(vinylidene fluoride), and an appropriate amount of N-methyl-2-pyrrolidone (NMP) were mixed together, so that a positive electrode slurry was prepared. Next, the positive electrode slurry was applied on two surfaces of aluminum foil, and the coating films thereof were dried, followed by rolling, so that a positive electrode in which positive electrode mixture layers each having a density of 3.6 $g/cm^3$ were formed on the two surfaces of the aluminum foil was formed.

Formation of Electrolyte Liquid

A lithium salt was dissolved in a nonaqueous solvent, so that an electrolyte liquid was prepared. As the nonaqueous solvent, a solvent in which ethylene carbonate (EC) and dimethyl carbonate (DMC) were mixed at a volume ratio of 3:7 was used. As the lithium salt, $LiPF_6$ was used. The concentration of $LiPF_6$ in the electrolyte liquid was set to 1.0 mol/L.

Formation of Nonaqueous Electrolyte Secondary Battery

Tabs were fitted to the respective electrodes, and the positive electrode and the negative electrode were spirally wound with the separators interposed therebetween so that the tabs were each located at an outermost circumferential portion, so that an electrode group was formed. After the electrode group was inserted into an aluminum laminate film-made exterior package and then vacuum-dried at 105° C. for 2 hours, the electrolyte liquid was charged, and an opening of the exterior package was sealed, so that a battery $A_1$ was obtained.

EXAMPLES 2 AND 3, COMPARATIVE EXAMPLES 1 AND 2

A content $M_{1a}$ of the first negative electrode active material and a content $M_{3a}$ of the precursor of the second negative electrode active material in the first region were each set to the value shown in Table 1.

The content of the first mixture in the first region was the same as the content of the second mixture in the second region. Hence, for convenience, the content $M_{1a}$ (percent by mass) in Table 1 is represented by a mass rate of the first negative electrode active material to the first mixture contained in the first region. The content $M_{2a}$ (percent by mass) in Table 1 is represented by a mass rate of the precursor of the second negative electrode active material to the first mixture contained in the first region. That is, in the first mixture, the content $M_{1a}$ of the first negative electrode active material and the content $M_{2a}$ of the precursor of the second negative electrode active material are each set to the value shown in Table 1, and the remaining (100-$M_{1a}$-$M_{2a}$) is regarded as the content of the third negative electrode active material.

A content $M_{1b}$ of the first negative electrode active material and a content $M_{2b}$ of the precursor of the second negative electrode active material in the second region were each set to the value shown in Table 1.

The content of the first mixture in the first region was the same as the content of the second mixture in the second region. Hence, for convenience, the content $M_{1b}$ (percent by mass) in Table 1 is represented by a mass rate of the first negative electrode active material to the second mixture contained in the second region. The content $M_{2b}$ (percent by mass) in Table 1 is represented by a mass rate of the precursor of the second negative electrode active material to the second mixture contained in the second region. That is, in the second mixture, the content $M_{1b}$ of the first negative electrode active material and the content $M_{2b}$ of the precursor of the second negative electrode active material are each set to the value shown in Table 1, and the remaining (100-$M_{1b}$-$M_{2b}$) is regarded as the content of the third negative electrode active material.

Except for those described above, batteries $A_2$, A3, B1, and B2 were each formed in a manner similar to that of Example 1.

TABLE 1

| | BATTERY No. | FIRST NEGATIVE ELECTRODE ACTIVE MATERIAL | | | PRECURSOR OF SECOND NEGATIVE ELECTRODE ACTIVE MATERIAL | | MASS RATIO $M_a$ | MASS RATIO $M_b$ |
|---|---|---|---|---|---|---|---|---|
| | | CONTENT IN FIRST REGION $M_{1a}$ (PERCENT BY MASS) | CONTENT IN SECOND REGION $M_{1b}$ (PERCENT BY MASS) | CONTENT OF Si PARTICLES IN FIRST LSX PARTICLE (PERCENT BY MASS) | CONTENT IN FIRST REGION $M_{2a}$ (PERCENT BY MASS) | CONTENT IN SECOND REGION $M_{2b}$ (PERCENT BY MASS) | | |
| EXAMPLE 1 | A1 | 7.5 | 4.5 | 55 | 3 | 3 | 0.71 | 0.60 |
| EXAMPLE 2 | A2 | 6.5 | 5.5 | 55 | 3 | 3 | 0.68 | 0.65 |
| EXAMPLE 3 | A3 | 8.5 | 3.5 | 55 | 3 | 3 | 0.74 | 0.54 |
| EXAMPLE 4 | A4 | 7.5 | 4.5 | 60 | 3 | 3 | 0.71 | 0.60 |
| EXAMPLE 5 | A5 | 7.5 | 4.5 | 46 | 3 | 3 | 0.71 | 0.60 |
| EXAMPLE 6 | A6 | 7.5 | 4.5 | 55 | 0 | 0 | 1.00 | 1.00 |
| COMPARATIVE EXAMPLE 1 | B1 | 6 | 6 | 55 | 3 | 3 | 0.67 | 0.67 |
| COMPARATIVE EXAMPLE 2 | B2 | 4.5 | 7.5 | 55 | 3 | 3 | 0.60 | 0.71 |
| COMPARATIVE EXAMPLE 3 | B3 | 6 | 6 | 55 | 0 | 0 | 1.00 | 1.00 |
| COMPARATIVE EXAMPLE 4 | 84 | 4.5 | 7.5 | 55 | 0 | 0 | 1.00 | 1.00 |

In addition, a mass ratio $M_a$ in Table 1 indicates a value of $M_{1a}/(M_{1a}+M_{2a})$, and a mass ratio $M_b$ indicates a value of $M_{1b}/(M_{1b}+M_{2b})$.

In addition, the state of the negative electrode mixture layer obtained when the second LSX is generated from the precursor of the second negative electrode active material is shown in the following Table 2.

TABLE 2

| | BATTERY No. | FIRST NEGATIVE ELECTRODE ACTIVE MATERIAL | | | SECOND NEGATIVE ELECTRODE ACTIVE MATERIAL | | MASS RATIO $M_A$ | MASS RATIO $M_B$ |
|---|---|---|---|---|---|---|---|---|
| | | CONTENT IN FIRST REGION $M_{1A}$ (PERCENT BY MASS) | CONTENT IN SECOND REGION $M_{1B}$ (PERCENT BY MASS) | CONTENT OF Si PARTICLES IN FIRST LSX PARTICLE (PERCENT BY MASS) | CONTENT IN FIRST REGION $M_{2A}$ (PERCENT BY MASS) | CONTENT IN SECOND REGION $M_{2B}$ (PERCENT BY MASS) | | |
| EXAMPLE 1 | A1 | 7.5 | 4.5 | 55 | 3.5 | 3.5 | 0.68 | 0.56 |
| EXAMPLE 2 | A2 | 6.5 | 5.5 | 55 | 3.5 | 3.5 | 0.65 | 0.61 |
| EXAMPLE 3 | A3 | 8.5 | 3.5 | 55 | 3.5 | 3.5 | 0.71 | 0.50 |
| EXAMPLE 4 | A4 | 7.5 | 4.5 | 60 | 3.5 | 3.5 | 0.68 | 0.56 |
| EXAMPLE 5 | A5 | 7.5 | 4.5 | 46 | 3.5 | 3.5 | 0.68 | 0.56 |
| EXAMPLE 6 | A6 | 7.5 | 4.5 | 55 | 0 | 0 | 1.00 | 1.00 |
| COMPARATIVE EXAMPLE 1 | B1 | 6 | 6 | 55 | 3.5 | 3.5 | 0.63 | 0.63 |
| COMPARATIVE EXAMPLE 2 | B2 | 4.5 | 7.5 | 55 | 3.5 | 3.5 | 0.56 | 0.68 |
| COMPARATIVE EXAMPLE 3 | B3 | 6 | 6 | 55 | 0 | 0 | 1.00 | 1.00 |
| COMPARATIVE EXAMPLE 4 | B4 | 4.5 | 7.5 | 55 | 0 | 0 | 1.00 | 1.00 |

The content of the second negative electrode active material in Table 2 indicates the content of the second LSX (in the state in which the Si particles dispersed in the $Li_4SiO_4$ phase occludes no lithium) generated from the precursor ($SiO_z$) of the second negative electrode active material.

The total content of the first negative electrode active material, the second negative electrode active material, and the third negative electrode active material in the first region was the same as the total content of the first negative electrode active material, the second negative electrode active material, and the third negative electrode active material in the second region. Hence, for convenience, the content $M_{1A}$ (percent by mass) of the first negative electrode active material in the first region in Table 2 is represented by a mass rate of the first negative electrode active material to the total of the first negative electrode active material, the second negative electrode active material, and the third negative electrode active material contained in the first region. The content $M_{2A}$ (percent by mass) of the second negative electrode active material in the first region is represented by a mass rate of the second negative electrode active material to the total of the first negative electrode active material, the second negative electrode active material, and the third negative electrode active material contained in the first region.

The content $M_{1B}$ (percent by mass) of the first negative electrode active material in the second region in Table 2 is represented by a mass rate of the first negative electrode active material to the total of the first negative electrode active material, the second negative electrode active material, and the third negative electrode active material contained in the second region. The content $M_{2B}$ (percent by mass) of the second negative electrode active material in the second region is represented by a mass rate of the second negative electrode active material to the total of the first negative electrode active material, the second negative electrode active material, and the third negative electrode active material contained in the second region.

The mass ratio $M_A$ in Table 2 indicates a value of $M_{1A}/(M_{1A}+M_{2A})$, and the mass ratio $M_B$ indicates a value of $M_{1B}/(M_{1B}+M_{2B})$.

EXAMPLES 4 AND 5

Except for that in the formation of the first negative electrode active material, a mixing mass ratio between the lithium silicate ($Li_2Si_2O_5$) having an average particle diameter of 10 μm and the silicon raw material (3N, average particle diameter: 10 μm) was adjusted so that the content of the silicon particles in the first LSX particle was set to the value shown in Table 1, batteries A4 and A5 were each formed in a manner similar to that of Example 1.

EXAMPLE 6

As the first mixture, a mixture was prepared by mixing 7.5 parts by mass of the first negative electrode active material and 92.5 parts by mass of the third negative electrode active material. As the second mixture, a mixture was prepared by mixing 4.5 parts by mass of the first negative electrode active material and 95.5 parts by mass of the third negative electrode active material. Except for those described above, a battery A6 was formed in a manner similar to that of Example 1.

COMPARATIVE EXAMPLE 3

As the first mixture and the second mixture, a mixture was prepared by mixing 6 parts by mass of the first negative electrode active material and 94 parts by mass of the third negative electrode active material. Except for that described above, a battery B3 was formed in a manner similar to that of Example 1.

COMPARATIVE EXAMPLE 4

As the first mixture, a mixture was prepared by mixing 4.5 parts by mass of the first negative electrode active material and 95.5 parts by mass of the third negative electrode active material. As the second mixture, a mixture was prepared by mixing 7.5 parts by mass of the first negative electrode active material and 92.5 parts by mass of the third negative electrode active material. Except for those described above, a battery B4 was formed in a manner similar to that of Example 1.

The batteries thus formed were each evaluated by the following methods.

Evaluation 1: Initial Capacity

After a constant current charge was performed at a current of 0.3 C to a voltage of 4.2 V, a constant voltage charge was performed at a voltage of 4.2 V to a current of 0.02 C. Subsequently, a constant current discharge was performed at a current of 0.2 C to a voltage of 2.5 V, and a discharge capacity by this discharge was obtained as an initial capacity. A rest period between the charge and the discharge was set to 10 minutes. The charge/discharge was performed in an environment at 25° C.

Evaluation 2: Cycle Capacity Maintenance Rate A

After a constant current charge was performed at a current of 0.3 C to a voltage of 4.15 V, a constant voltage charge was performed at a voltage of 4.15 V to a current of 0.02 C. Subsequently, a constant current discharge was performed at a current of 0.5 C to a voltage of 2.85 V. A rest period between the charge and the discharge was set to 10 minutes. The charge/discharge was performed in an environment at 25° C.

The charge/discharge was repeatedly performed under the charge/discharge conditions described above. A rate (percent) of a discharge capacity at a 200th cycle to a discharge capacity at a first cycle was obtained as a cycle capacity maintenance rate A.

Evaluation 3: Cycle Capacity Maintenance Rate B

After a constant current charge was performed at a current of 0.7 C to a voltage of 4.15 V, a constant voltage charge was performed at a voltage of 4.1 V to a current of 0.02 C. Subsequently, a constant current discharge was performed at a current of 0.5 C to a voltage of 2.85 V. A rest period between the charge and the discharge was set to 10 minutes. The charge/discharge was performed in an environment at 25° C.

The charge/discharge was repeatedly performed under the charge/discharge conditions described above. A rate (percent) of a discharge capacity at a 75th cycle to a discharge capacity at a first cycle was obtained as a cycle capacity maintenance rate B.

Evaluation 4: Direct Resistance (DC-IR)

In an environment at 25° C., after a constant current charge was performed at a current of 0.3 C to a voltage of 4.2 V, a constant voltage charge was performed at a voltage of 4.2 V to a current of 0.02 C. As described above, a battery having an SOC of 100% was prepared.

Subsequently, in an environment at 25° C., a constant current discharge was performed at a current I of 0.5 C for 30 seconds. A value (ΔV/I) calculated by dividing the voltage difference (ΔV) between a voltage immediately before the start of the discharge and a voltage measured 10 seconds after the start of the discharge by the current I was obtained as a direct current resistance.

Evaluation 5: Direct Resistance (AC-IR)

In an environment at 25° C., after a constant current charge was performed at a current of 0.3 C to a voltage of 3.748 V, a constant voltage charge was performed at a voltage of 3.748 V to a current of 0.02 C. As described above, a battery having an SOC of 50% was prepared.

Subsequently, a reaction resistance was obtained using an alternating current impedance method. In particular, in an environment at 25° C., an alternating voltage was applied to the battery prepared as described above. The amplitude was set to 10 mV, and the range of frequency was set to 1 MHz to 0.01 Hz. From the diameter of a half circle drawn by Nyquist plot obtained in this case, the reaction resistance was obtained. As one factor influencing the reaction resistance, the permeability of the electrolyte liquid in the negative electrode may be mentioned.

The evaluation results are shown in Table 3.

INDUSTRIAL APPLICABILITY

The nonaqueous electrolyte secondary battery according to the present invention is useful as a main electric power source of a mobile communication device, a portable electronic device, and the like.

REFERENCE SIGNS LIST 1 electrode group
2 positive electrode lead
3 negative electrode lead
4 battery case

TABLE 3

|  | BATTERY No | DIRECT CURRENT RESISTANCE (mΩ) | REACTION RESISTANCE (mΩ) | CAPACITY INITIAL (Wh) | CYCLE CAPACITY MAINTENANCE RATE A (%) | CYCLE CAPACITY MAINTENANCE RATE B (%) |
|---|---|---|---|---|---|---|
| EXAMPLE 1 | A1 | 35.99 | 8.34 | 19.3 | 83.5 | 83.3 |
| EXAMPLE 2 | A2 | 36.10 | 8.47 | 19.3 | 83.3 | 82.9 |
| EXAMPLE 3 | A3 | 35.40 | 8.20 | 19.3 | 83.7 | 84.1 |
| EXAMPLE 4 | A4 | 35.60 | 8.13 | 19.5 | 83.7 | 83.6 |
| EXAMPLE 5 | A5 | 36.05 | 8.40 | 19.0 | 83.5 | 83.0 |
| EXAMPLE 6 | AC | 35.70 | 8.27 | 18.9 | 83.8 | 83.5 |
| COMPARATIVE EXAMPLE 1 | B1 | 36.48 | 8.61 | 19.3 | 82.9 | 79.4 |
| COMPARATIVE EXAMPLE 2 | B2 | 36.50 | 8.94 | 19.3 | 82.0 | 76.3 |
| COMPARATIVE EXAMPLE 3 | B3 | 36.31 | 8.44 | 18.9 | 83.1 | 80.0 |
| COMPARATIVE EXAMPLE 4 | B4 | 36.39 | 8.81 | 18.9 | 82.4 | 77.1 |

In each of the batteries $A_1$ to A3, a low direct current resistance, a low reaction resistance, and high cycle capacity maintenance rates A and B were obtained. In the batteries $A_1$ to A3, the mass ratio $M_A$ was 0.65 to 0.71, and the mass ratio $M_B$ was 0.50 to 0.61.

In the battery $A_1$ which used the second negative electrode active material, compared to the battery A6 which used no second negative electrode active material, a high initial capacity was obtained.

In each of the batteries $A_1$, A4, and A5, a low direct current resistance, a low reaction resistance, and high cycle capacity maintenance rates A and B were obtained. In the batteries $A_1$ and A4 in which the content of the first silicon particles in the first negative electrode active material was 50 to 80 percent by mass, the initial capacity was high, and the cycle characteristics were further improved.

Even in the battery A6 which used no second negative electrode active material, a low direct current resistance, a low reaction resistance, and high cycle capacity maintenance rates A and B were obtained.

In the batteries B1, B2, and B4, since the increase in roughness of the negative electrode surface was not promoted, the direct current resistance and the reaction resistance were increased, and the cycle capacity maintenance rates A and B were decreased. In the battery B3, since the increase in roughness of the negative electrode surface was not promoted, the direct current resistance was increased, and the cycle capacity maintenance rates A and B were decreased.

5 sealing plate
6 negative electrode terminal
7 gasket
8 sealing plug
11 negative electrode collector
12 negative electrode mixture layer
12a first region
12b second region

The invention claimed is:

1. A nonaqueous electrolyte secondary battery comprising: a positive electrode; a negative electrode; and an electrolyte liquid,
   wherein the negative electrode includes a negative electrode mixture layer containing a first negative electrode active material and a negative electrode collector to which the negative electrode mixture layer is adhered, the first negative electrode active material contains a first lithium silicate phase containing lithium, silicon, and oxygen and first silicon particles dispersed in the first lithium silicate phase,
   an atomic ratio $A_1$:O/Si of the oxygen to the silicon in the first lithium silicate phase satisfies a relationship of $2 < A_1 \leq 3$, and
   in a thickness direction from an outer surface of the negative electrode mixture layer to an inner surface of the negative electrode mixture layer contacting the negative electrode current collector, an existence ratio of the first negative electrode active material in the outer surface of the negative electrode mixture layer is higher as compared to that at the inner surface.

2. The nonaqueous electrolyte secondary battery according to claim 1,
   wherein, when a ½ region of the negative electrode mixture layer from the outer surface is regarded as a first region, and a ½ region of the negative electrode mixture layer from the inner surface is regarded as a second region, a content $M_{1A}$ of the first negative electrode active material in the first region and a content $M_{1B}$ of the first negative electrode active material in the second region satisfy a relationship of $0 \leq M_{1B}/M_{1A} < 1$.

3. The nonaqueous electrolyte secondary battery according to claim 2, wherein the second region of the negative electrode mixture layer contains at least a second negative electrode active material, the second negative electrode active material contains a second lithium silicate phase containing lithium, silicon, and oxygen and second silicon particles dispersed in the second lithium silicate phase, and an atomic ratio $A_2$:O/Si of the oxygen to the silicon in the second lithium silicate phase satisfies a relationship of $3 < A_2 \leq 4$.

4. The nonaqueous electrolyte secondary battery according to claim 3, wherein the first region and the second region each contain the first negative electrode active material and the second active material, and a mass ratio $M_A$ of the first negative electrode active material to the total of the first negative electrode active material and the second negative electrode active material in the first region is high as compared to a mass ratio $M_B$ of the first negative electrode active material to the total of the first negative electrode active material and the second negative electrode active material in the second region.

5. The nonaqueous electrolyte secondary battery according to claim 4, wherein the first lithium silicate phase has a composition represented by a formula: $Li_2Si_xO_{2x+1}$, and the x satisfies a relationship of $1 \leq x \leq 2$, and the second lithium silicate phase has a composition represented by a formula: $Li_2Si_yO_{2y+1}$, and they satisfies a relationship of $½ \leq y < 1$.

6. The nonaqueous electrolyte secondary battery according to claim 5, wherein the mass ratio $M_A$ is 0.65 to 0.71, and the mass ratio $M_B$ is 0.50 to 0.61.

7. The nonaqueous electrolyte secondary battery according to claim 2, wherein, before a first charge, the second region of the negative electrode mixture layer contains at least a precursor of the second negative electrode active material, the precursor of the second negative electrode active material has a composition represented by a formula: $SiO_z$, and the z satisfies a relationship of $0.5 \leq z \leq 1.5$.

8. The nonaqueous electrolyte secondary battery according to claim 1, wherein the first silicon particles in the first negative electrode active material has a content of 50 to 80 percent by mass.

* * * * *